July 1, 1930.  J. G. CAMPBELL ET AL  1,768,564
ELECTRICAL APPARATUS
Filed Feb. 25, 1924    2 Sheets-Sheet 2
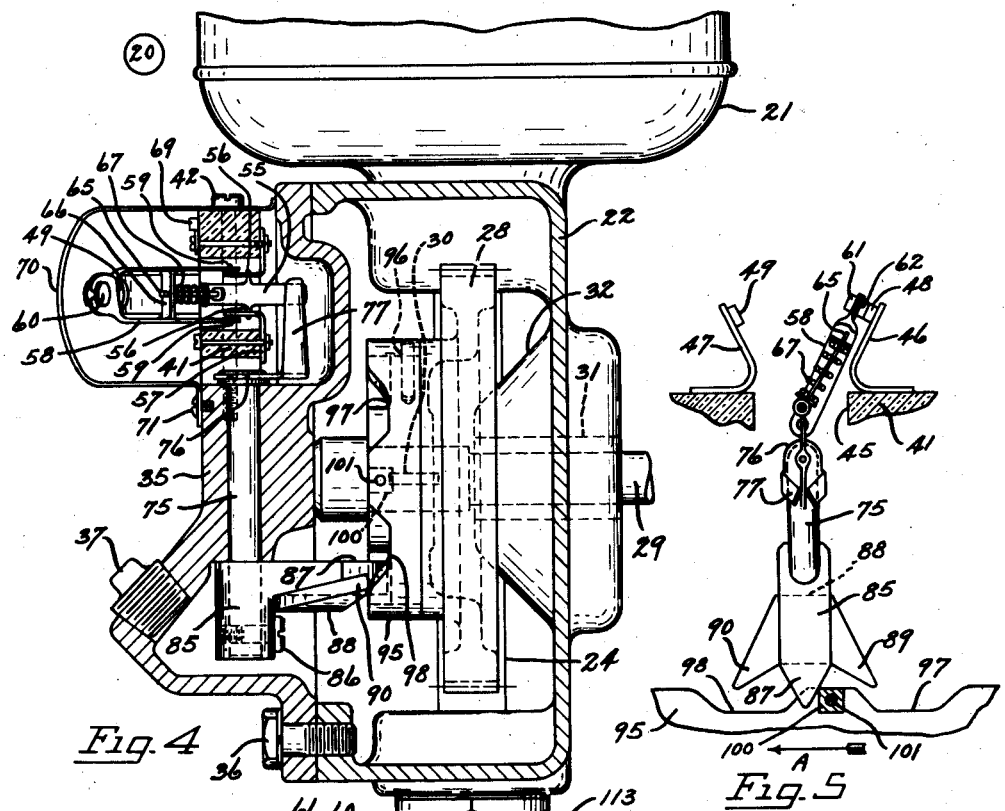
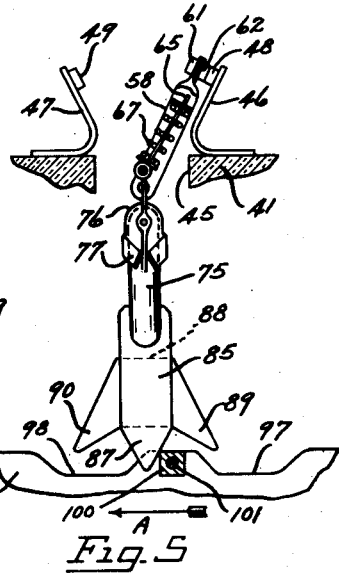
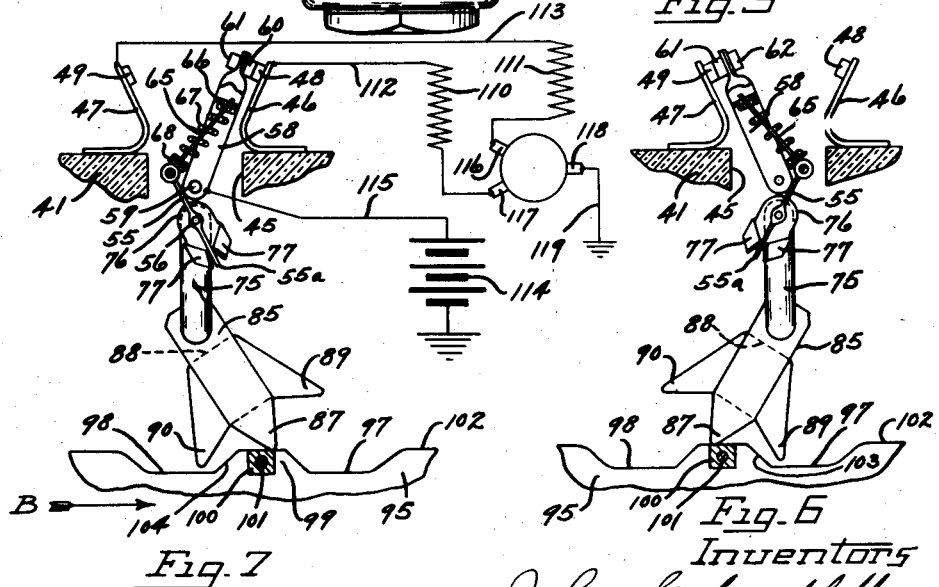
Inventors
John G Campbell
and Clarence Warner
By Spencer, Small and Hardman
Their Attorneys.

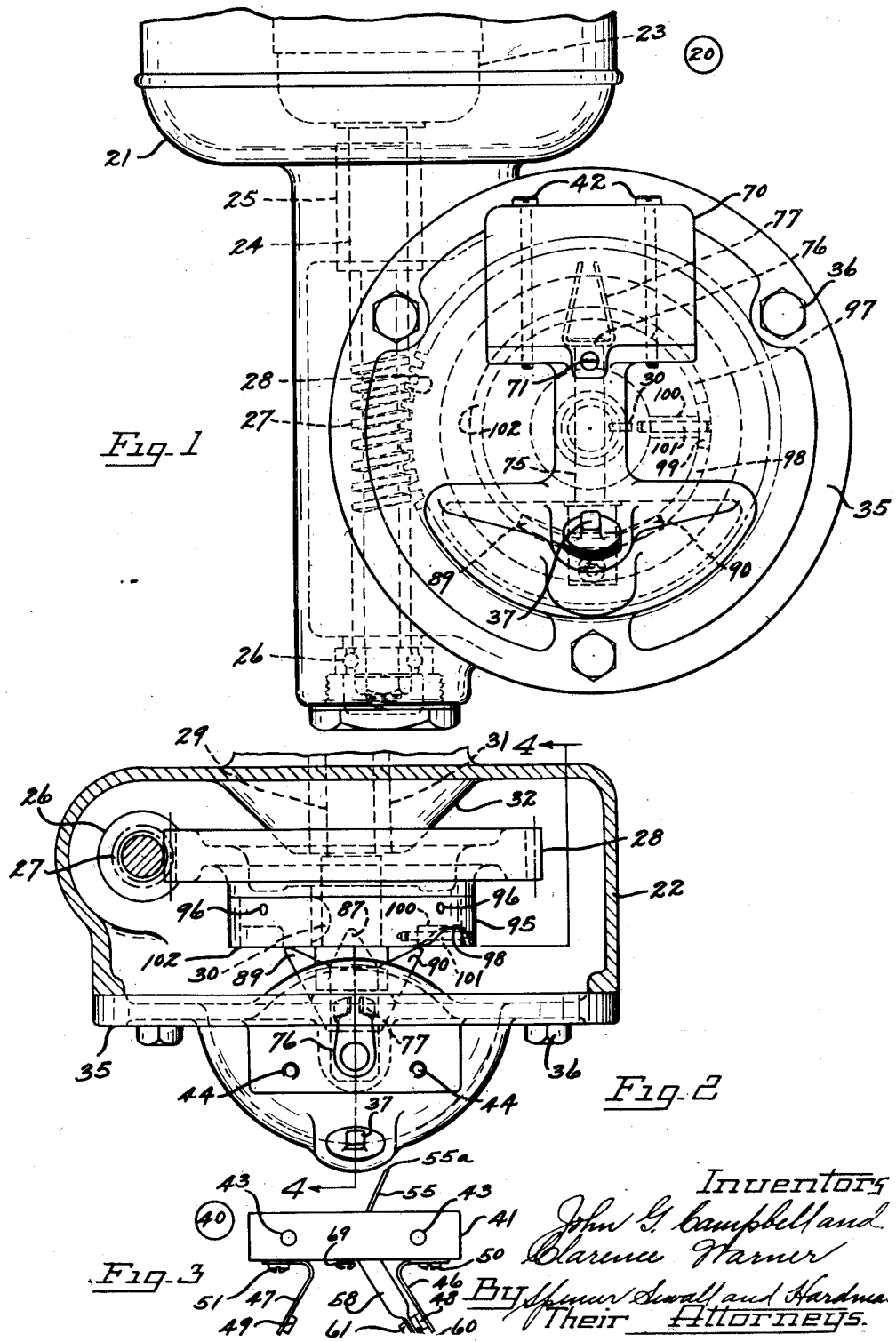

Patented July 1, 1930

1,768,564

UNITED STATES PATENT OFFICE

JOHN G. CAMPBELL AND CLARENCE WARNER, OF DAYTON, OHIO, ASSIGNORS TO DELCO-LIGHT COMPANY, OF DAYTON, OHIO, A CORPORATION OF DELAWARE

ELECTRICAL APPARATUS

Application filed February 25, 1924. Serial No. 694,841.

This invention relates to apparatus for automatically reversing an electric motor and includes among its objects simplicity of construction and reliability and quietness of operation.

To accomplish these and other objects, the present invention provides a power unit including an electric motor, a gear housing from which extends a shaft for driving a work machine, and speed reduction gearing in the housing for connecting the motor and shaft. A motor reversing switch is mounted on the gear housing and mechanism cooperates with parts driven by said shaft in the housing and with the switch for intermittently operating the switch to produce rotation of the motor in opposite directions alternately in response to a certain movement of said gear. This switch operating mechanism is constructed so that excessive operation of the switch such as would tend to injure it is prevented, and so that the switch cannot accidentally be operated during the interval between operations performed by said motor driven shaft.

Further objects and advantages of the present invention will be apparent from the following description, reference being had to the accompanying drawings, wherein a preferred form of embodiment of the present invention is clearly shown.

In the drawings:

Fig. 1 is a fragmentary view in elevation of a motor and gear housing unit embodying the present invention.

Fig. 2 is a sectional view of the unit shown in Fig. 1 disclosing the tumble switch actuating mechanism, the switch mechanism being removed.

Fig. 3 is a top view of the tumble switch.

Fig. 4 is a sectional view taken on the line 4—4 of Fig. 2.

Figs. 5, 6, and 7 are diagrammatic views of the tumble switch and actuating mechanism therefor in its various positions.

Referring to the drawings, a motor and gear housing unit, represented as a whole by the numeral 20, comprises a motor frame 21 and a gear housing frame 22. Motor armature 23 is provided with an armature shaft 24 which is journalled in bearings 25 and 26 supported by frame 21, and carries a worm 27 which cooperates with a worm gear 28. Gear 28 is secured to a shaft 29 by a key 30, shaft 29 being journalled in a bearing 31 carried by an inwardly extending boss 32 on gear frame 22.

The tumble switch and part of the actuating mechanism therefor to be described is carried by and is removable in assembled relation with a cover 35 which is secured to the gear frame 22 by bolts 36. Cover 35 is provided with a removable plug 37 which permits lubricant to be placed in the gear housing frame 22.

The tumble switch 40 comprises an insulating base 41 which is secured to cover 35 by screws 42 which pass through holes 43 in said base 41 and engage tapped holes 44 in cover 35, see Figs. 2 and 3. Base 41 is provided with an aperture 45, adjacent the opposite edges of which are mounted conducting arms 46 and 47 which carry stationary contacts 48 and 49 respectively. Terminal screws 50 and 51 are connected with arms 46 and 47 respectively, and are adapted to be connected respectively with the motor field windings 110 and 111 by wires 112 and 113 respectively. A switch lever 55 is provided with ears 56 which are pivotally mounted upon arms 57 which are secured to base 41 and extend into aperture 45. A switch blade 58 is pivotally mounted upon ears 59 carried by arms 57, and carries on its opposite face contacts 60 and 61 which are adapted to cooperate with stationary contacts 48 and 49 respectively. Blade 58 is connected with terminal 69 connected to battery 114 by wire 115. One end of lever 55 is pivotally connected with a plunger 65 which loosely passes through an apertured stop member 66 carried by switch blade 58. A coil spring 67 surrounds plunger 65 and bears against stop 67 and stop 68 carried by said plunger. Windings 110 and 111 are connected with motor brushes 116 and 117 respectively, and motor brush 118 is connected to ground by wire 119. A cover 70 serves to protect the switch mechanism from injury and from dust and dirt, and is held in position on cover 35 by screws 42 and 71.

The tumble switch actuating mechanism comprises a rod 75 which is journalled in cover 35 and has riveted at its upper end a plate 76 provided with upstanding fingers 77 converging toward each other. The end 55ᵃ of switch lever 55 is adapted to be received between the fingers 77 and to be operated from one position to another thereby to cause the operation of switch blade 58. A trip pawl 85 is secured to the lower end of rod 75, as viewed in Fig. 4, by a screw 86. The center line of plate 76, is substantially in alignment with the center line of trip pawl 85. Pawl 85 is provided with a pointed nose portion 87, and has secured to the lower surface thereof, as viewed in Fig. 4, a plate 88. Plate 88 is provided with pointed ear portions 89 and 90 which are bent upwardly, as viewed in Fig. 4, at an angle oblique to the plane of the upper surface of trip pawl 85. The end of nose portion 87 of trip pawl 85 is more remote from the center line of rod 75 than the pointed ends of ear portions 89 and 90.

The mechanism for causing operation of the trip pawl 85 comprises a ring or band 95 which is attached to the hub of worm gear 28 by screws 96. This ring is provided with notches 97 and 98 cut in the edge thereof facing the trip pawl 85 and ear portions 89 and 90. Notches 97 and 98 are spaced apart by the portion 99 of said ring 95. Portion 99 carries on its inner surface a block or cam 100 secured thereto by a screw 101. Nose portion 87 of trip pawl 85 extends within the ring 95 into the path of travel of block 100 and is adapted to be actuated thereby to cause operation of the tumble switch mechanism 40, described heretofore. Ear portions 89 and 90 are adapted to be received by the notches 97 and 98 respectively for preventing overthrow of trip pawl 85 and are also adapted to engage the edge surface 102 of ring 95 for preventing such movement of rod 75 as would allow the tumble switch to be actuated.

*Mode of operation*

Upon operation of the motor armature 23, the worm 27 carried by armature shaft 24 drives the worm gear 28 carrying with it the ring 95. Referring to Fig. 5, the tumble switch and actuating mechanism therefor are shown in position just previous to the operation of the tumble switch, and the ring 95 is being rotated in the direction of the arrow A. The block 100 is in engagement with the nose portion 87, and the spring 67 is under compression. The plunger 65 and lever 55 are being moved into parallel relation with the center line of switch blade 58 by movement of rod 75 and fingers 77 and spring 67 is being still further compressed between stops 66 and 68 by the toggle action of plunger 65 and lever 55. Current is now flowing from the battery 114, through wire 115, switch blade 58, contacts 60 and 48, wire 112, field winding 110, motor brush 117, across the motor, brush 118, wire 119 and back to the battery 114 via ground.

As ring 95 continues to rotate in the direction of the arrow A in Fig. 5, the lever 55 and plunger 65 will be moved through the center line of switch blade 58 and will function as a toggle joint to cause the energy stored up in spring 67 to be released. When this energy is released, the switch blade 58 will be quickly moved on its pivot 59 to the position shown in Fig. 6. The ear portion 89 at this time is moved into the notch 97, and the point of nose portion 87 is in engagement with the top surface of block 100, as indicated in Fig. 6. The circuit will now be from the battery 114, through wire 115, switch blade 58, contacts 61 and 49, wire 113, field winding 111, which is of opposite magnetic effect from that of winding 110, motor brush 116, brush 118, wire 119 back to the battery via ground. The direction of rotation of the motor armature 23 will thus be reversed, and the gear 28 and ring 95 will be rotated in a direction opposite to that indicated by the arrow A in Fig. 5, namely in the direction of arrow B in Fig. 7.

Referring to Fig. 6, as the ring 95 moves to the right, the ear portion 89 will be engaged by the surface 103 and the trip pawl 85 will be returned to vertical position as shown in Fig. 5. The pointed ends of ear portions 89 and 90 will then be riding upon the surface 102 of ring 95, and the tumble switch will be held in the position shown in Fig. 6 during one complete revolution of the ring 95.

Upon approximately one complete revolution of the ring 95, in the direction of arrow B in Fig. 7, the block 100 will engage the left hand side of nose portion 87, as viewed in Fig. 7, causing the tumble switch to be moved to the position shown in Fig. 7, in a manner similar to that described above. The motor will then be reversed and the ring 95 will be rotated in the direction opposite that of the arrow A in Fig. 5. The surface 104 of ring 95 will then engage ear 90 moving it out of the notch 98 into vertical position as shown in Fig. 5, so that the ears 89 and 90 will engage the surface 102 of ring 95 during one complete rotation thereof, for the purpose heretofore described.

Simplicity of construction and quietness of operation is afforded since the electric reversing switch is constructed so that it can be removed assembled from the gear housing cover, leading the switch operating mechanism assembled. The switch is provided with a removable cover which tends to reduce noise resulting from the closing of the contacts. The gear housing cover supports the switch operating mechanism except the parts rotatable with the shaft 29. The noise of impact of these rotating parts with the parts carried by the gear housing cover is reduced since these parts are enclosed, and lubrication for the reversing mechanism is provided by the lubricant in the gear housing used also for lubricating the shaft bearings and spiral gearing.

As already explained reliability of operation is afforded by reason of the fact that the switch cannot be excessively operated since excessive movement of the shaft 75 is prevented by the ears 89 and 90 striking the surfaces 97 and 98 respectively; and since the co-operation of ears 89 and 90 with the surface 102 prevents throwing the switch except at the proper angular position of the shaft 29. The rebounding of the ears 89 and 90 from surfaces 97 and 98 is limited by the engagement of the nose portion 87 with the block 100 so that the portion 87 cannot rebound sufficiently to cause the switch to be operated. The shock of striking the pawl 85 by the cam block 100 to move the pawl into position for throwing the switch, and the shock of stopping the pawl by the striking of the ears 89 and 90 with surfaces 97 and 98 is absorbed in the mechanism which operates the switch. Hence the switch is not subjected to the violent action which would be present in the switch if it were acted directly upon by the motor driven cam.

While the form of embodiment of the present invention as herein disclosed, constitutes a preferred form, it is to be understood that other forms might be adopted, all coming within the scope of the claims which follow.

What is claimed is as follows:

1. Apparatus for reversing an electric motor, comprising, in combination, a motor reversing switch having an actuating member, a pivoted pawl for moving the switch member in either direction, a motor operated cam for engaging the pawl, and means for preventing sufficient movement of the pawl to operate the switch except when the cam strikes the pawl, said means including fingers carried by the pawl and a motor driven ring having a surface for engaging the fingers to prevent movement of the pawl except when actuated by the cam and having notches for receiving the fingers to permit movement of the pawl by the cam.

2. Apparatus for reversing an electric motor, comprising, in combination, a motor reversing switch having an actuating member, a pawl for moving the switch in either direction, a motor driven device, a cam operated by the device for striking the pawl, means movable with the pawl, and mechanism driven by said device and cooperating with said means for preventing excessive movement of the pawl.

3. Apparatus for reversing an electric motor, comprising, in combination, a motor reversing switch having a movable actuating member, a pawl for moving the switch member in either direction, a cam operated by the motor for striking the pawl, and means for preventing excessive movement of the pawl after being struck by the cam and for maintaining the pawl in a non-operative position with respect to said member throughout a certain operation of the motor and for conditioning the pawl for operation after a further operation of the motor.

In testimony whereof we hereto affix our signatures.

JOHN G. CAMPBELL.
CLARENCE WARNER.